(12) United States Patent
Klekamp et al.

(10) Patent No.: US 8,958,704 B2
(45) Date of Patent: *Feb. 17, 2015

(54) GENERATION OF A FEEDBACK SIGNAL FOR A POLARIZATION MODE DISPERSION COMPENSATOR IN A COMMUNICATION SYSTEM USING ALTERNATE-POLARIZATION

(75) Inventors: Axel Klekamp, Markgröningen (DE); Henning Bülow, Kornwestheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 952 days.

This patent is subject to a terminal disclaimer.

(21) Appl. No.: 12/998,133

(22) PCT Filed: Nov. 7, 2008

(86) PCT No.: PCT/IB2008/003529
§ 371 (c)(1),
(2), (4) Date: Mar. 21, 2011

(87) PCT Pub. No.: WO2010/043924
PCT Pub. Date: Apr. 22, 2010

(65) Prior Publication Data
US 2011/0182572 A1    Jul. 28, 2011

(30) Foreign Application Priority Data

Oct. 15, 2008 (WO) .................. PCT/IB2008/055342

(51) Int. Cl.
*H04B 10/00* (2013.01)
*H04B 10/079* (2013.01)
*H04B 10/2569* (2013.01)
*H04B 10/532* (2013.01)

(52) U.S. Cl.
CPC ...... *H04B 10/07951* (2013.01); *H04B 10/2569* (2013.01); *H04B 10/532* (2013.01)
USPC .......................... 398/159; 398/158; 398/161

(58) Field of Classification Search
None
See application file for complete search history.

(56) References Cited

U.S. PATENT DOCUMENTS 8,005,360 B2 *  8/2011  Xie .................................. 398/65
2004/0218933 A1  11/2004  Fludger et al.

FOREIGN PATENT DOCUMENTS

DE  10 2006 048733 A1  4/2008
EP       1 860 802 A    11/2007

* cited by examiner

*Primary Examiner* — Darren E Wolf
(74) *Attorney, Agent, or Firm* — Carmen Patti Law Group, LLC

(57) ABSTRACT

The invention relates to a method of generating a feedback signal for adjusting a polarization mode dispersion compensator (PMDC, 21) in a transmission system with alternate-polarization. A first signal (37) is determined by measuring a spectral component of the radio frequency modulation of an optical signal (33) at a particular radio frequency. Preferably, the radio frequency essentially corresponds to half the symbol rate of the optical signal (33). Also a second signal (35) is determined by coupling the optical signal (33) into a delay line interferometer (DLI, 50) having a delay essentially corresponding to the symbol period or an odd multiple of the symbol period between its arms (51, 54). Downstream of the DLI (50), the signal is optical-to-electrically converted. Downstream of the optical-to-electrical conversion, an intensity measurement is performed. The first (37) and second (35) signals are then combined to generate the feedback signal (28).

13 Claims, 7 Drawing Sheets

GENERATION OF A FEEDBACK SIGNAL FOR A POLARIZATION MODE DISPERSION COMPENSATOR IN A COMMUNICATION SYSTEM USING ALTERNATE-POLARIZATION

FIELD OF THE INVENTION

The invention relates to compensation of polarization mode dispersion (PMD) in optical communication systems, in particular to the generation of a feedback signal for adjusting a polarization mode dispersion compensator (PMDC) in a communication system using an alternate-polarization (Apol) format.

BACKGROUND OF THE INVENTION

With increasing channel transmission rate (in particular in case of 40 Gbps and beyond), PMD severely degrades the signal quality. The reason for PMD is that an optical fiber exhibits two orthogonal principle axes corresponding to two principle states of polarization (PSP), which have different travelling speeds. A signal's first portion aligned with one principle axis propagates with different speed than a signal's second portion aligned with the other principle axis. Therefore, the two portions separate along the fiber, thereby spreading the signal pulses and causing signal interference between subsequent symbols (also called ISI—intersymbol interference). The delay between both portions of the signal is characterized by the differential group delay (DGD), which is proportional to the square root of the travel distance.

A polarization mode dispersion compensator (PMDC) may be used upstream of a receiver to compensate for the fiber-induced PMD. Such PMDC is controlled by a feedback loop. A feedback signal is derived from the optical signal downstream of the PMDC (i.e. after compensation). Such feedback signal gives an indication of the current degree of PMDC compensation. Based on the feedback signal, one or more parameters of the PMDC are adapted to improve the compensation. Various approaches for generating a feedback signal are known: One option is a degree of polarization (DOP) based feedback signal, where the DOP indicates the portion of the optical beam which is polarized. An alternative is a feedback signal based on measuring a part of the RF-spectrum of the carrier modulation. Here, the feedback signal may be based on one or several spectral lines. According to another alternative, it is also possible to monitor the received eye (e.g. the eye opening) and to use this information as an eye monitor feedback signal. Alternatively, an error signal generated by a FEC (forward error correction) algorithm may be used as a feedback signal. The latter two approaches have the drawback that they require a complete receiver with clock and data recovery; in the latter approach also an FEC unit is needed. In case an extra receiver is dedicated to this purpose, the costs are increased. In case no extra receiver is used but the feedback signal is derived from the receiver downstream of the PMDC, the flexibility of the PMDC is reduced since it cannot be used as a stand-alone device anymore.

To enhance tolerance to intra-channel non-linear effects, in particular in case of high data rates (such as 40/43 Gbps—gigabit per second), alternate-polarization (APol) modulation formats may be employed, which use alternate polarization for each symbol, i.e. adjacent symbols have orthogonal polarizations. A very promising modulation format for 40/43 Gbps data rates is Apol RZ DPSK (return-to-zero differential-phase-shift-keying).

Due to the alternate polarizations in APol modulation formats, the generation of a feedback signal for a PMDC in a transmission system using APol modulation is more difficult.

For Apol modulation, using DOP as feedback is not suitable since an Apol signal is inherently depolarized.

Generating a feedback signal by monitoring the intensity of a radio-frequency (RF) spectral line is also problematic in case of Apol modulation. When measuring the RF-tone at half the symbol rate (e.g. at 20/21.5 GHz in case of 40/43 Gbps Apol RZ DPSK), such feedback signal is "blind" when the alternate-polarization pulses of the optical are launched with a 45° polarization offset to the principle axes of the fiber, i.e. one polarization of the two alternate polarizations has a 45° offset compared to one of the principle axes of the fiber. For a 45° launch, the feedback signal does not change in dependency on the remaining DGD (i.e. the non-compensated DGD) and thus does not provide any information about the current degree of compensation.

A solution to overcome this problem when monitoring the intensity of a RF spectral line is to use a fast polarization scrambler (typically at the transmitter) as discussed in the application PCT/FR2008/051865 having the title "Apparatus and method for compensating polarization mode dispersion" and filed on Oct. 15, 2008 Such polarization scrambler varies the splitting ratio among the principle axes such that a mean feedback signal over all polarization states is generated (i.e. for all launching polarization offsets). Typically, scrambler frequencies considerably higher than 1 MHz are used.

SUMMARY OF THE INVENTION

It is an object of the present invention to provide an alternative approach for generating a feedback signal for adjusting a polarization mode dispersion compensator in an Apol communication system.

This object is achieved by the subject-matter of the independent claims.

In the following a first solution for overcoming the problem is discussed.

A first aspect of the first solution relates to a method of generating a feedback signal for adjusting a PMDC. The feedback signal is based on an Apol optical signal downstream of the PMDC (e.g. a signal derived by an optical tap). E.g. the Apol signal is a phase modulated signal (e.g. PSK, DPSK, QPSK, DQPSK). According to the method, a first signal is determined by measuring a spectral component of the RF modulation of the optical signal at a particular radio frequency, in particular by measuring the intensity of the spectral component. It is also possible to measure a spectral component of the RF modulation of a signal which is based on said optical signal, e.g. the RF modulation of an optical signal derived from the optical signal. Preferably, the radio frequency essentially corresponds to half the symbol rate of the optical signal (e.g. 20/21.5 GHz in case of 40/43 Gbps Apol RZ DPSK signal). Alternatively, the radio frequency may correspond to 1.5 times the symbol rate (i.e. 60 GHz in case of a 40 Gbps Apol RZ DPSK signal) or 2.5 times the symbol rate, or any other odd harmonic of half the symbol rate. It may be also possible that the radio frequency corresponds to the symbol rate. Moreover, a plurality of spectral components may be measured (e.g. at a frequency corresponding to half bit rate and at a frequency corresponding to the bitrate).

The first signal may directly correspond to the measured intensity of the spectral component or may correspond to a signal derived from the measured intensity of the spectral component, e.g. a signal where the measured intensity is multiplied by a factor.

In addition to determining a first signal, also a second signal is determined. This is performed by coupling the optical signal in a DLI having a delay essentially corresponding to the symbol period or corresponding to an odd multiple of the symbol period between its arms. Preferably, the delay of the DLI corresponds to the symbol period (i.e. a 1-bit DLI is preferably used in case of Apol RZ DPSK signal). Downstream of the DLI, the signal is optical-to-electrically converted. Downstream of the optical-to-electrical conversion (i.e. after a photodetector), an intensity measurement is performed. The second signal may correspond to the measured intensity or may correspond to a signal derived from the measured intensity (e.g. a signal where the measured intensity is multiplied by a factor).

The first and second signals are then combined to generate the feedback signal. Preferably, the first and second signals are summed.

The inventive method for generating a feedback signal avoids the need of a polarization scrambler: The feedback signal is based on two components and thus the feedback is typically not "blind" for particular launch polarization states as in case of a feedback signal based on measuring an RF-tone alone. Thus, a polarization scrambler is not mandatory anymore; nevertheless, a polarization scrambler may be still used (preferably, no polarization scrambler is used). The solution allows to reduce the costs when not using an additional polarization scrambler anymore. It should be noted that in case of using a polarization scrambler in case of RF-tone feedback typically one scrambler would be necessary per DWDM (dense wavelength division multiplex) channel since a single scrambler after a multiplexer for all DWDM channels may result in reliability problems. Moreover, any potential reliability problems associated with such polarization scrambler can be prevented when avoiding the scrambler.

Preferably, the concept is used in a stand-alone or a receiver integrated PMDC for next generation submarine transmission systems using an Apol modulation format at 40 Gbps or 43 Gbps.

According to a preferred embodiment, the first signal is derived by a plurality of steps: Based on the optical signal, an optical-to-electrical conversion is performed. After conversion, bandpass filtering is performed, with the center frequency of the bandpass filtering corresponding to the radio frequency. E.g. in case of a 43 Gbps Apol RZ DPSK signal, a 21.5 GHz bandpass filter corresponding to half the bit rate may be used. After bandpass filtering, the intensity is measured (e.g. by a microwave power detector).

For deriving the second signal, preferably a DLI with two output ports (a constructive output port and a destructive output port) and optical-to-electrical conversion means having two photodiodes are used. The first photodiode is coupled to the constructive output and the second photodiode is coupled to the destructive output. More preferably, a balanced photodetector is used for optical-to-electrical conversion. Evaluating both output ports of the DLI increases the swing of the second signal. Moreover, in case no remaining PMD is present, the measured intensity after a balanced photodetector and this also the second signal are essential zero (or very small). Thus, the adaption algorithm can be configured to minimize the feedback signal (comprising the second signal as a component), thereby minimizing the remaining PMD. It should be noted that also a single photodiode instead of two photodiodes may be used. In this case the single photodiode is typically connected to a single output port of the DLI.

Preferably, the first and second signals are both 0 or both minimal in case of no remaining PMD (i.e. in case of zero DGD). This allows to adapt the PMDC to the adaption target of zero DGD by minimizing both signals. Minimizing both signals may be realized by minimizing a preferred feedback signal formed by the sum of both signals.

It should be noted that basically the above mentioned embodiments of the invention can be arbitrarily combined. Furthermore, it should be noted that the disclosure of the invention also covers other claim combinations than the claim combinations which are explicitly given by the back references in the dependent claims, i.e. the claims can be basically combined in any order.

A second aspect of the first solution relates to a method for adapting a PMDC. According to the method, a feedback signal is generated by determining first and second signals as discussed before. Based on the feedback signal, at least one control signal for controlling the PMDC is determined (e.g. signal for adjusting a polarization controller in the PMDC).

According to a preferred embodiment of the method, the control loop minimizes the feedback signal when adapting the PMDC.

The method for adapting a PMDC is used for compensating PMD. For compensating PMD, a received optical signal is launched in a PMDC. The method for adapting the PMDC adapts the PMDC such that the PMD is compensated (at least partly).

A third aspect of the first solution relates to an apparatus for generating a feedback signal. The features of the apparatus correspond to the method steps of the method for generating a feedback signal.

The apparatus comprises first determining means for determining a first signal, wherein the first means comprise means for measuring a spectral component of the radio frequency modulation of the optical signal (or of a signal based thereon) at a particular radio frequency. The first signal may correspond to the intensity of the spectral component or may correspond to a signal derived from the measured intensity of the spectral component.

The apparatus further comprises second determining means for determining a second signal. The second determining means comprise a DLI, where the delay between its arms essentially corresponds to the symbol period or an odd multiple of the symbol period (preferably, the delay corresponds to the symbol period). The second determining means further have a photodetector downstream of the delay line interferometer and means for intensity measuring (e.g. a broadband power detector) downstream of the photodetector. The second signal may correspond to the measured intensity or may correspond to a signal derived from the measured intensity (e.g. a signal where the measured intensity is multiplied by a factor).

In addition, means for combining the first signal and the second signal are provided, with the feedback signal based on the combination. E.g. the feedback signal may correspond to the sum of the first and second signals.

As discussed in connection with the first aspect of the invention, the delay line interferometer has preferably two output signals and the photodetector is preferably a balanced photodetector.

According to a preferred embodiment of the invention, the first determining means comprise a photodetector for converting the optical signal into an electrical signal and—downstream of the photodetector—an electrical bandpass filter. The filter has a center frequency corresponding to the radio frequency. Typically, the center frequency essentially corresponds to half the symbol rate of the optical signal (e.g. 21.5 GHz in case of 43 Gbps Apol RZ DPSK signal). Preferably, the first determining means further comprise a power detector downstream of the electrical bandpass filter.

The above remarks related to the first aspect of the first solution are also applicable to the second aspect of the first solution.

A third aspect of the first solution relates to a PMDC unit. The PMDC unit may be integrated in the receiver or may be a stand-alone device. The PMDC unit comprises a PMDC. Further, the unit comprises an apparatus for generating a feedback signal as discussed in connection with the second aspect of the invention. In addition, the PMDC unit has means for deriving at least one control signal for controlling the compensator based on the feedback signal. E.g. such control signal is a signal for adjusting a polarization controller in the PMDC.

The above remarks related to the first and second aspects of the first solution are also applicable to the third aspect of the first solution.

A fourth aspect of the first solution relates to an optical receiver comprising the PMDC unit as discussed above. The above remarks related to the first, second and third aspects of the invention are also applicable to the fourth aspect of the invention.

In the following a second solution is described:

The second solution is based on polarization scrambling (in particular at the transmitter) and generating a feedback signal for adjusting a PMDC by means of a DLI (instead of monitoring the intensity of an RF-tone). Said remarks for generating the second signal by means of a DLI in the first solution are also applicable to the second solution. Moreover, the remarks to polarization scrambling in said application PCT/FR2008/051865 having the title "Apparatus and method for compensating polarization mode dispersion" and filed on Oct. 15, 2008 are also applicable to the second invention. Said remarks in PCT/FR2008/051865 to polarization scrambling are herewith incorporated by reference.

A first aspect of the second solution relates to a method for compensating PMD. A received alternate-polarization optical signal (e.g. a Apol RZ DPSK signal) is coupled into a PMDC. A feedback signal is generated based on an optical signal downstream of the PMDC. As discussed already in connection with the generation of the second signal in the first solution, in the second solution the feedback signal is determined by coupling the optical signal downstream of the PMDC into a DLI having between its arms a delay essentially corresponding to the symbol period or an odd multiple of the symbol period (preferably, a delay of one symbol period, e.g. one bit in case of Apol RZ DPSK). Then, optical-to-electrical converting downstream of the DLI is performed. For determining the feedback signal an intensity measurement downstream of the optical-to-electrical conversion is performed. Based on the feedback signal, at least one control signal for controlling the PMDC is determined. As also discussed in PCT/FR2008/051865 polarization scrambling is performed upstream of the PMDC, e.g. an Apol signal is polarization scrambled at the transmitter, or a received Apol signal is polarization scrambled at the receiver (in front of the PMDC). The method may comprise polarization scrambling an optical Apol signal across an input polarization state asynchronous to the polarization alternation of the Apol signal.

A second aspect of the second solution relates to a system for compensating PMD, with the features of the second aspect (system) corresponding to features of the first aspect (method). The system comprises a polarization scrambler and a PMDC downstream of the scrambler. The polarization scrambler may operate and may be arranged as discussed in said application PCT/FR2008/051865 which is incorporated by reference. E.g. the polarization scrambler may be placed on the side of a transmitter. Alternatively, the scrambler may be placed on the side of a receiver. The polarization scrambler may be adapted for scrambling across an input polarization state of said PMDC asynchronous to an Apol transmission signal transmitted by use of an optical transmission fiber.

Moreover, the system comprises a feedback signal generator downstream of the PMDC. The feedback signal generator comprises a DLI having between its arms a delay essentially corresponding to the symbol period or an odd multiple of the symbol period (preferably, a delay of one symbol period, e.g. one bit in case of Apol RZ DPSK). An optical signal downstream of the PMDC is coupled into the DLI. The feedback signal generator further comprises a photodetector downstream of the DLI (e.g. a balanced photodetector) and means for intensity measuring downstream of the photodetector. In addition, the system comprises means for deriving at least one control signal for controlling the PMDC based on the feedback signal.

The feedback signal generator may be used to generate a mean feedback signal over all polarization states covered by the polarization scrambler. The polarization scrambler enables to scramble across the input polarization state and so to generate an unequivocal feedback signal which depends on the DGD and is independent from the input polarization state. The polarization scrambler allows to change the input polarization state so that the mean measured intensity is no longer dependent on the input polarization state. For achieving that the feedback signal gets independent of the polarization state, the duration of a scrambling cycle of the scrambler is preferably shorter than the acquisition time of the feedback routine. Preferably, the speed of the scrambler is in the order of several megahertz, preferably 20 MHz, if the time scale for the feedback signal aquisition is around one microsecond. Preferably, the scrambling is executed asynchronous to the polarization alternation of the transmission signal, so that the transmission signal itself is not influenced by the scrambling. The transmission signal may be scrambled across the input polarization state asynchronous to the bit rate of the transmission signal.

BRIEF DESCRIPTION OF THE DRAWINGS

The invention is explained below in an exemplary manner with reference to the accompanying drawings, wherein.

DETAILED DESCRIPTION OF THE INVENTION

Figure 1:
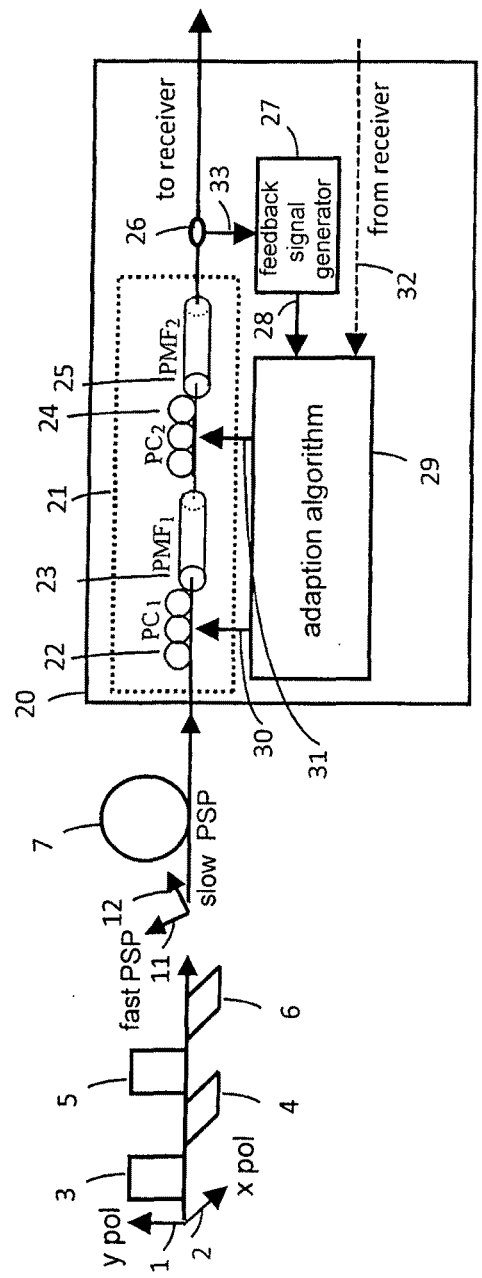
FIG. 1 illustrates an embodiment of a feedback loop for adapting a PMDC.

FIG. 1 shows a feedback loop for adapting a PMDC in a transmission system using an Apol format. Such transmission system preferably uses a 40 or 43 Gbps Apol RZ DPSK format. Preferably, the transmission system is a long-haul transmission system, in particular a submarine transmission system. The right hand of FIG. 1 illustrates an example for an Apol RZ signal as generated by a transmitter. The Apol signal has a plurality of RZ pulses 3-6, where each pulse 3-6 has either a first polarization 1 (here: "x pol") or a second polarization 2 (here: "y pol"). Both polarizations 1, 2 are orthogonal to each other. As shown in FIG. 1, two consecutive pulses 3-6 are transmitted in different polarizations 1, 2, e.g. in the TE (transverse electric) polarization and the TM (transverse magnetic) polarization. Each pulse 3-6 is preferably phase modulated. In case of Apol RZ PSK and Apol RZ DPSK, each pulse has one of two possible phase states, e.g. 0 or π. The stream of pulses 3-6 can be subdivided in odd and even pulses (e.g. pulses 3, 5 correspond to even pulses, whereas pulses 4, 6 correspond to odd pulses). In case of Apol RZ DPSK, the information is typically encoded by the change of the phase state between two consecutive odd pulses and the change of the phase state between consecutive even pulses. E.g. two consecutive odd (or even) pulses encode a logical "1" in case of no phase change, and two consecutive odd (or even) pulses encode a logical "0" in case of a phase change of π (or vice versa). For demodulation a two-bit DLI may be used.

The Apol signal is launched into a fiber 7 which introduces PMD and thus causes signal distortion. Fiber 7 exhibits a slow principle axis corresponding to a slow PSP 11 and a fast principle axis corresponding to a fast PSP 12. In case polarization 1 (2) would be aligned to PSP 11 (PSP12), pulses 3, 5 (4, 6) were transmitted only via the fast (slow) axis. This would move odd pulses 4, 6 relative to even pulses 3, 5. However, in FIG. 1 the two polarizations 1, 2 are not aligned to the PSPs 11, 12. Thus, each pulses 3, 6 is partially transmitted in PSP 11 and partially transmitted in PSP 12. Due to the DGD between PSP 11 and PSP 12, each signal pulse spreads (in most cases in addition to the relative movement of odd and even pulses to each other). After travelling through fiber 7, the distorted signal is coupled to a PMDC unit 20 which tries to reverse the PMD induced distortions. Here, PMDC unit 20 comprises a two-stage PMDC 21. A two-stage PMDC is also discussed in the document "Dynamic Performance and Speed Requirement of Polarization Mode Dispersion Compensations", Journal of Lightwave Technology, Vol. 24 Nol. 11 Nov. 2006 pages 3968-3975 with its discussion of the two-stage PMDC being hereby incorporated by reference. The first stage of two-stage PMDC 21 comprises polarization controller (PC) 22 and polarization maintaining fiber (PMF) 23. The second stage of two-stage PMDC 21 comprises PC 24 and PMF 25. It should be noted that PMDC unit 20 does not necessarily need to be a two-stage PMDC 21, in principle any optical PMDC 21 may be used. At the output of PMDC 21, a portion of the optical signal is tapped by optical tap 26 and coupled into feedback signal generator 27. E.g. 10% of the optical power is coupled into feedback signal generator 27. The remaining optical power is fed to the actual receiver (not shown) which is located downstream of PMDC unit 21.

Feedback signal generator 27 generates a feedback signal 28 based on tapped optical signal 33. Feedback signal 28 is coupled into an adaption algorithm unit 29, which determines one or more control signals 30, 31 for controlling PMDC 21 (here: for controlling PC 22, 23).

As discussed above, a feedback signal generator 27 may generate a feedback signal 28 based on one or several lines of the RF modulation spectrum of the optical signal, in particular the RF-tone at half symbol rate (e.g. 20/21.5 GHz in case of 40/43 Gbps Apol RZ DPSK modulation). However, in this case a polarization scrambler either at the transmitter or at the receiver in front of PMDC unit 20 is needed. Such solution of using a polarization scrambler has the drawback of higher costs due to the additional polarization scrambler. Moreover, reliability problems may occur when using such polarization scrambler.

Instead of feedback signal 28, feedback signal 32 from the receiver may be used in adaption algorithm unit 29 for determining one or more control signals 30, 31 for controlling PMDC 21. Alternatively, an extra receiver dedicated to control of PMDC 21 may be integrated in PMDC unit 20 (downstream of PMDC 21) for generating feedback signal 32. Such feedback signal 32 generated by the actual receiver or by an extra receiver may be an eye monitor feedback signal (which is e.g. based on the eye opening) or a bit error signal (FEC error count) generated by a FEC (forward error correction) algorithm. When using such feedback signals, a polarization scrambler is not necessary. However, it should be noted that in case an extra receiver is used for generating signal 32 the costs are increased. In case no extra receiver is used but the feedback signal is derived from the receiver, the flexibility of the PMDC is reduced since it cannot be used as a stand-alone device anymore.

The first solution of the invention avoids the need of a polarization scrambler by forming a new feedback signal which works for feedback control without a polarization scrambler (nevertheless, a scrambler could be used). Also, this solution allows to realize a stand-alone PMDC unit 20 (i.e. without feedback from the receiver) for an alternate-polarization based transmission system.

Figure 2:
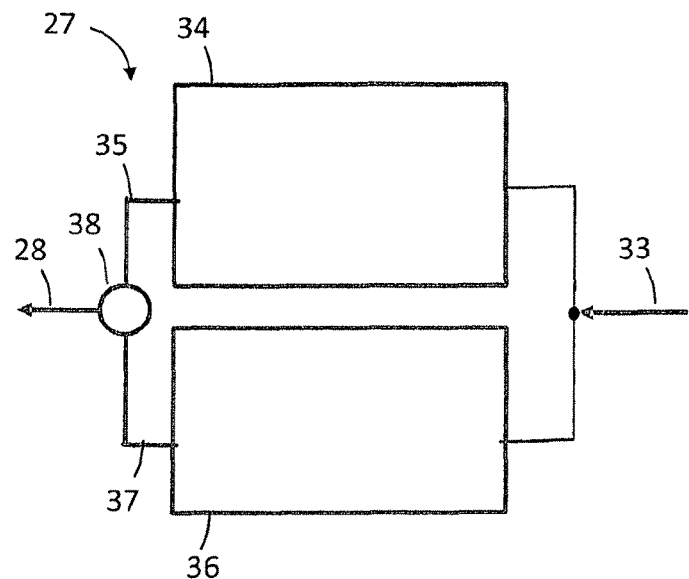
FIG. 2 illustrates a first embodiment of the first solution for generating a feedback signal.

FIG. 2 illustrates an embodiment of a feedback signal generator 27 which may be used in the system of FIG. 1. Feedback signal generator 27 receives an optical signal downstream of PMDC 21, in particular optical signal 33 from tap 26 in FIG. 1. Feedback signal generator comprises a first unit 36 for determining a first electrical signal 37 based on optical signal 33. First unit 36 comprises means for measuring a spectral component of the radio frequency modulation of optical signal 33 at a particular radio frequency, in particular at half symbol rate (20/21.5 GHz in case of a 40/43 Gbps Apol RZ DPSK signal). Further, feedback signal generator 27 comprises a second unit 34 for determining a second electrical signal 35. Second unit 34 comprises a DLI (not shown) having between its arms a delay essentially corresponding to the symbol period or an odd multiple of the symbol period (preferably, a symbol period), with signal 33 coupled into the delay line interferometer. Further, the second unit 34 comprises a photodetector downstream of the DLI, and means for intensity measuring downstream of the photodetector. Second signal 35 is based on the intensity measurement. In addition, feedback signal generator 27 comprises a combining unit 38 configured to combine first signal 37 and second signal 35, thereby generating feedback signal 28.

According to a preferred embodiment, new feedback signal 28 corresponds to the sum of two feedback signal components: an intensity signal characterizing the intensity of the RF-tone at half symbol rate (half bitrate in case of binary phase modulation like PSK or BPSK), and a signal generated by a 1-symbol DLI with an balanced photo detector.

Figure 3:
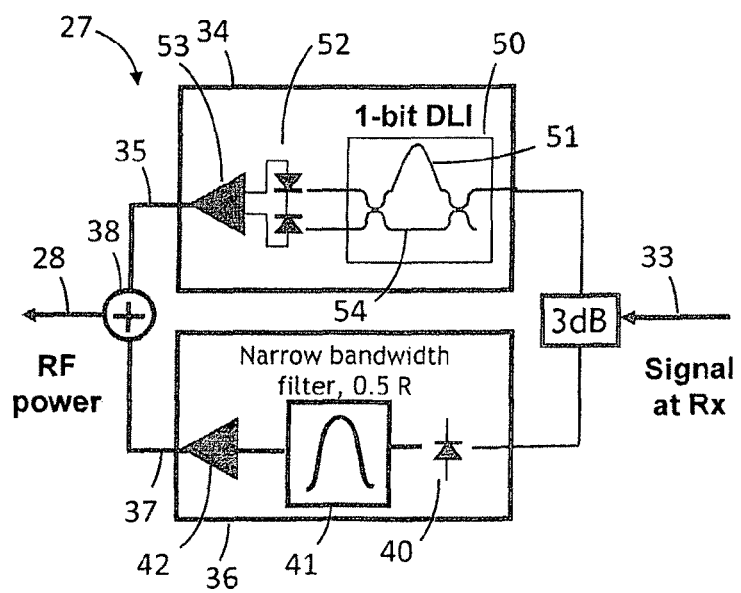
FIG. 3 illustrates a second embodiment of the first solution for generating a feedback signal.

The generation of a feedback signal 28 formed by the sum of two electrical signals 37, 35 provided by a spectral component (in particular spectral line) intensity detector 36 and a DLI intensity detector 34 is shown in FIG. 3. In particular, intensity detectors 34 and 36 form power detectors. Spectral component intensity detector 36 corresponds to first unit 36 in FIG. 2, whereas DLI intensity detector 34 corresponds to second unit 34 in FIG. 2.

Figurative elements in FIGS. 2 and 3 denoted by the same reference signs correspond to each other. In FIG. 3, feedback signal generator 27 receives optical signal 33. Optical signal 33 is split by a 3 dB splitter into two optical waves each having half the power of optical signal 33.

The lower wave in FIG. 3 is fed in spectral component intensity detector 36. Spectral component intensity detector 36 comprises a photodiode 40 which detects optical data signal 33 and demodulates the optical signal 33 in an electrical signal in the RF frequency range (the electrical signal comprises the RF modulation of the optical carrier). Further, spectral component intensity detector 36 comprises a narrow bandwidth bandpass filter 41, with the center frequency $f_0$ of filter 41 corresponding to half the symbol rate R, i.e. $f_0=0.5 \cdot R$. In case of a 40/43 Gbps Apol signal, a 20/21 GHz bandpass filter with a center frequency $f_0$ of 20/21 GHz is used. In addition, spectral component intensity detector 36 comprises a microwave power detector 42 downstream of bandpass filter 41. First signal 37 corresponds to the intensity of the 20/21 GHz spectral component of the modulation of optical signal 33 as determined by spectral component intensity detector 36.

The upper wave in FIG. 3 is fed in DLI intensity detector 34. DLI intensity detector 34 comprises a 1-bit DLI 50 having an arm length difference corresponding to 1 bit period. Upper arm 51 of DLI 50 is longer than lower arm 54 and provides an extra delay of 1 bit period (25 ps in case of a 40 Gbps signal) in comparison to lower arm 54. In DLI 50 the optical signal is split into two beams, one beam in the upper arm 51 and one beam in the lower arm 54. Due to the extra delay in the upper arm, the beam in the upper arm is delayed by 1 bit period in comparison to the beam in lower arm 54. Then, the two beams are superimposed. DLI 50 has two output ports: a constructive output and a destructive output. The signals at the two DLI output ports are then detected by a balanced photodetector 52 having two differential photodiodes. A broadband microwave power detector 53 is located downstream of balanced photodetector 52, which determines the intensity of the differential output signal of balanced photodetector 52. This intensity corresponds to signal 35. In case of a 40/43 Gbps Apol RZ DPSK signal, the combination of photodetector 52 and broadband power detector 53 should have a bandwidth larger than 10 GHz, preferably 30 or 35 GHz or even more.

Feedback signal 28 is formed by the sum of the two electrical signals 35, 37 provided by DLI intensity detector 36 and spectral component intensity detector 34 (see adder 38).

Preferably, the swing (or the maximum value) of the two electrical signals 35, 37 is made to be essentially the same. For this purpose, one or more additional electrical or optical amplifiers or attenuators (not shown) may be placed in the upper and/or lower signal paths. Alternatively, signal 35 and/or signal 37 may be weighed before adding by a weighting coefficient (not shown) downstream of the power detectors 53, 47.

The signals 35 and 37 may be analog-to-digital converted before summing in block 38. Alternatively, feedback signal 28 is analog-to-digital converted downstream of block 38.

Figure 4:
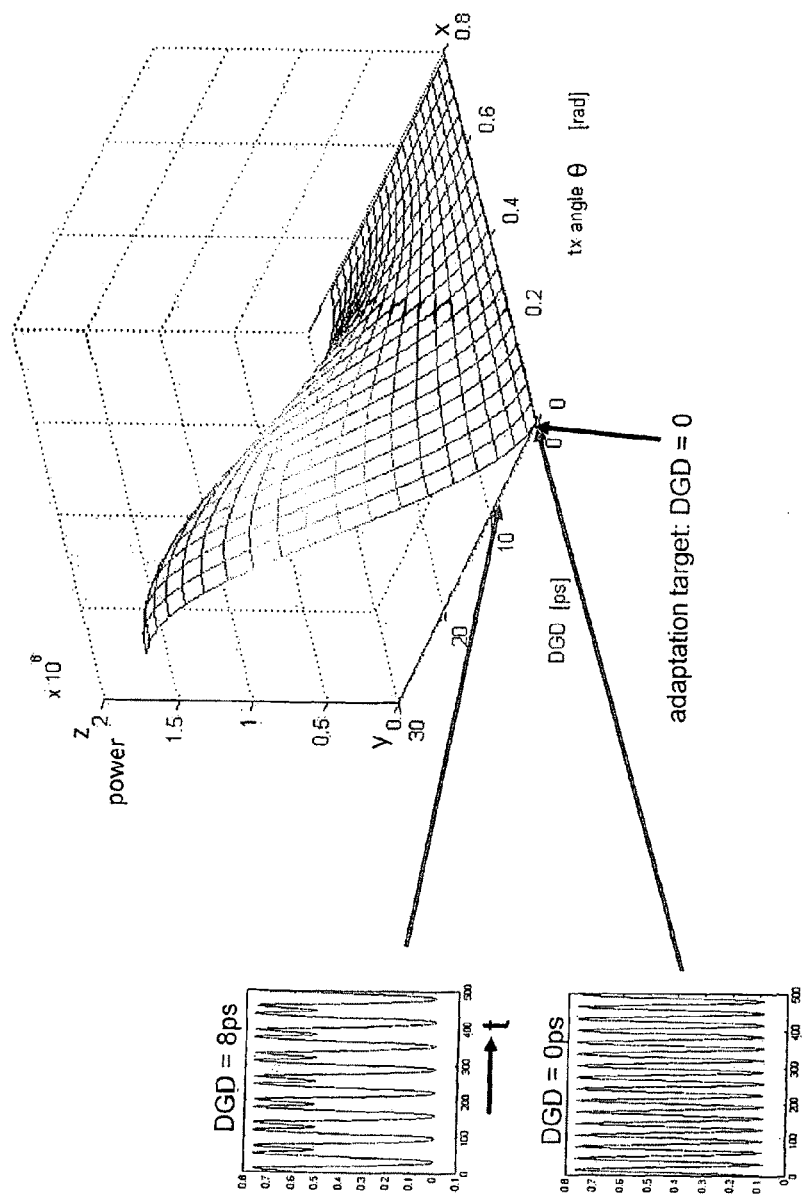
FIG. 4 illustrates the intensity of a 20 GHz RF-tone versus input polarization state (x-axis) and fiber DGD (y-axis)

FIG. 4 illustrates the intensity of the half bitrate spectral component (z-axis) in dependency of a polarization launch angle θ (x-axis) and the fiber DGD (y-axis). Here, the incoming signal is a 40 Gbps Apol RZ DPSK signal; thus a half bitrate spectral component is determined at 20 GHz. For the intensity diagram in FIG. 4 it is assumed that PMDC 21 is not present or inactive. When PMDC 21 is present and the feedback loop is closed, the feedback loop adapts PMDC 21 such that the fiber DGD is (at least partly) compensated by PMDC 21, optimally resulting in an adaption target of zero remaining DGD.

The intensity in FIG. 4 is dependent on the angle θ (x-axis) between the two orthogonal polarizations of the launched Apol signal at the transmitter and the PSPs (see polarizations 1, 2 and PSPs 11, 12 in FIG. 1). In case of θ=0, the polarizations 1, 2 and the PSPs 11, 12 are aligned; the odd symbols 4, 6 are transmitted in one principle axis, whereas the even symbols 3, 5 are transmitted in the other principle axis: Due to DGD, the time distance between the even and odd pulses changes when travelling through the fiber 7. In case of θ=π/4≈0.8 each pulse 3-6 is equally distributed among both PSPs. In this case each pulse spreads proportionally to the DGD.

Figure 5:
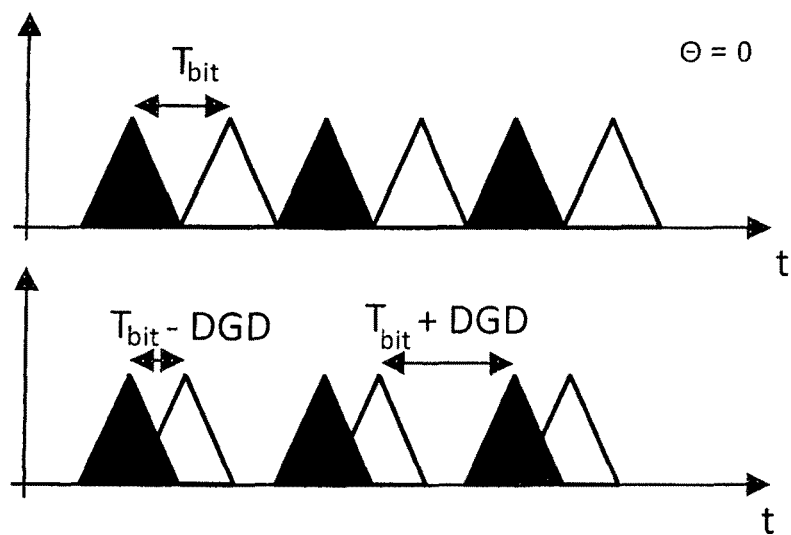
FIG. 5 illustrates separation of pulses in case of $\theta=0$.
Figure 6:
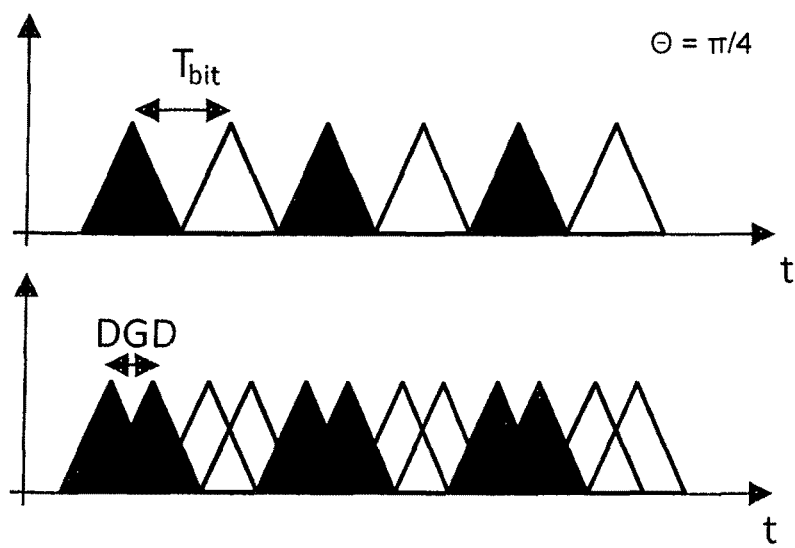
FIG. 6 illustrates spreading of pulses in case of $\theta=\pi/4$.

FIG. 5 indicates how the time delay between subsequent pulses changes in case of θ=0 The upper diagram in FIG. 5 schematically illustrates a sequence of the even (white triangles) and odd (black triangles) pulses at the transmitter. Consecutive pulses have a time distance corresponding to the bit period $T_{bit}$ (e.g. 25 ps in case of a 40 Gbps Apol RZ DPSK signal). After travelling through the fiber, the time distance changes such that the pulses group in pairs of two pulses (see lower diagram in FIG. 5). The situation is different in case of θ=π/4 as illustrated in FIG. 6. Here, the pulses spread proportional to the DGD (see spread pulses in the lower diagram of FIG. 6). For angles θ between 0 and π/4 both effects illustrated in FIG. 5 and FIG. 6 occur at the same time.

As show in FIG. 4, the intensity of the 20 GHz spectral component has the largest values for a given DGD at θ=0 This is due to the fact that in case of θ=0 two subsequent pulses move together (movement proportional to DGD) and form a common pulse (see lower diagram in FIG. 5), thereby generating a spectral component at half bitrate (i.e. 20 GHz here). The maximum intensity occurs at a θ=0 and a DGD corresponding to the bit period (here: 25 ps).

The convergence of consecutive pulses is also shown in FIG. 4 in the smaller upper diagram on the left hand (the smaller lower diagram on the left hand indicates the situation in case of no remaining DGD).

In FIG. 4 the spectral component vanishes at an input polarization state of θ=π/4 (≈0.8). This is due to the fact that an odd pulse and an even pulse do not group together but each pulse only spreads (see lower diagram in FIG. 6).

Thus, no spectral component at half bitrate is present (i.e. the intensity is essentially zero) if there is no remaining PMD (i.e. the resulting DGD after compensation is zero), or, if the signal is equally distributed among both PSPs (i.e. θ=π/4). For θ=π/4, the intensity signal 37 as generated by spectral component intensity detector 36 gives no information about the effective DGD. Thus, pure spectral line feedback is "blind" in case of θ=π/4 Even worse, based on intensity signal 37 alone it is not possible to differ between the adaption target of DGD=0 and any DGD in case of θ=π/4 such that a pure spectral line feedback loop may convert to θ=π/4 and DGD≠0

Figure 7:
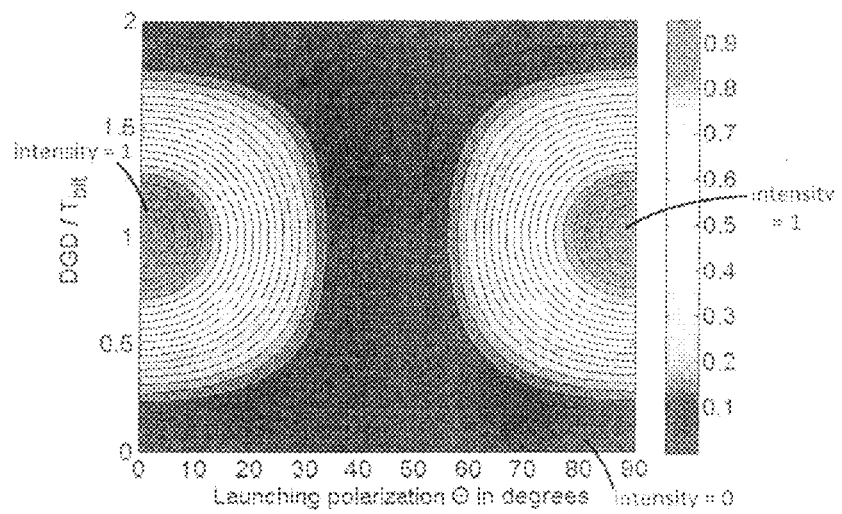
FIG. 7 illustrates the intensity of a half-bitrate tone versus launching polarization angle $\theta$ and $DGD/T_{bit}$.

The diagram in FIG. 7 basically corresponds to the diagram in FIG. 4. The x-axis indicates the angle θ in degrees, whereas the y-axis corresponds to the ratio of the DGD and the bit period $T_{bit}$. The intensity is indicated by the grey scale value and is normalized to a maximum intensity of 1 For θ=π/4, the intensity becomes 0, irrespectively of the DGD. For θ=0 (or θ=π/2) and DGD=$T_{bit}$ (i.e. DGD/$T_{bit}$=1), the intensity becomes maximal (intensity=1).

The problem that pure spectral line feedback is "blind" in case of θ=π/4 can be overcome by a polarization scrambler at the transmitter performing a variation of θ, thereby generating a mean feedback signal over a plurality of polarization states or even all polarization states. Since feedback signal 28 in FIG. 3 not only comprises intensity signal 37 but also comprises signal 35 from DLI intensity detector 34, this problem is overcome without the need of a polarization scrambler.

Figure 8:
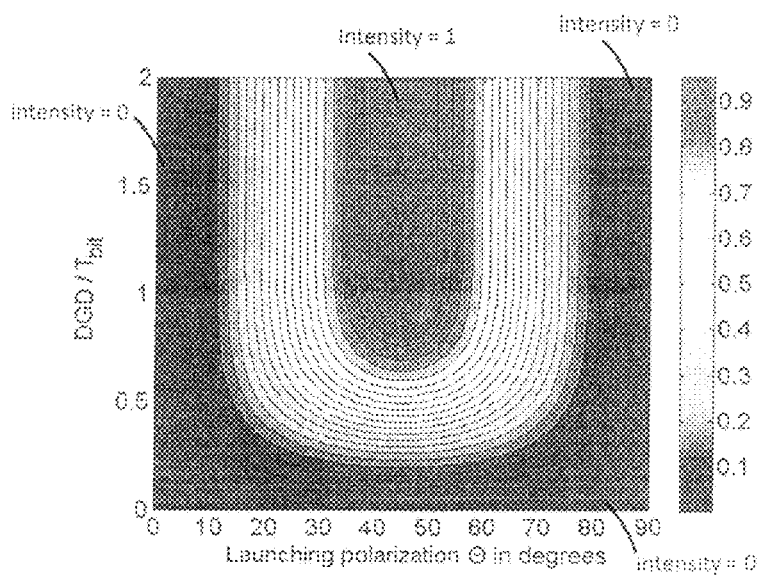
FIG. 8 illustrates of the intensity of a balanced detector and 1-bit DLI versus launching polarization angle $\theta$ and $DGD/T_{bit}$.

FIG. 8 shows the intensity of the balanced detector 52 and the 1-bit DLI 50 (i.e. the intensity signal 35 as measured by DLI intensity detector 34) versus angle θ (x-axis) and the ratio (y-axis) of fiber DGD and bit period $T_{bit}$. In FIG. 8 the intensity is normalized to a maximum intensity of 1 As evident from FIG. 8, feedback signal component 35 generated by the 1-bit DLI 51 and balanced detector 52 is also dependent on the angle θ, but in contrast to the intensity signal in FIG. 7 intensity signal 35 in FIG. 8 becomes maximal (for a given DGD) at θ=π/4. Intensity signal 35 vanishes at θ=0 and at θ=π/2. In additional, intensity signal 35 vanishes in case no DGD is present. The reason for this behavior lies in the fact that adjacent bits (or generally symbols) have orthogonal polarizations. After the 1-bit DLI 50 such adjacent bits do not interfere at the constructive and destructive ports if no PMD is present (no DGD) or if each of the two Apol polarizations of the Apol signal were launched in one of the PSPs of the PMD (i.e. in case of θ=0 and θ=π/2). In these cases no interference contrast is detected by the balanced photo diodes 52. In case of non-vanishing PMD (i.e. DGD≠0), detector 34 provides a non-vanishing output signal 35 if the Apol signal is not completely launched in the PSPs (i.e. θ≠0 or π/2).

The adaption algorithm for PMDC 21 should minimize both signals 35 and 37 to reach the point for DGD=0. This allows for simple addition of both signals 35, 37 to get combined feedback signal 28.

Figure 9:
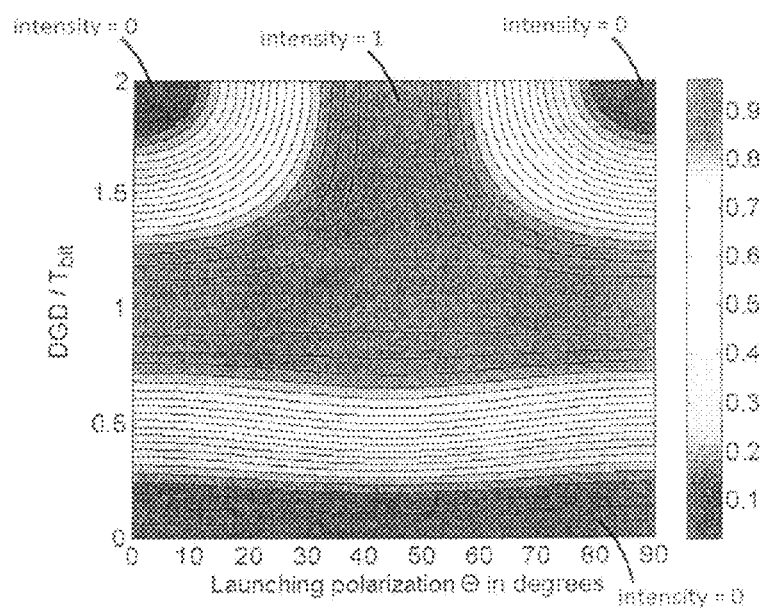
FIG. 9 illustrates the combined intensity versus launching polarization angle $\theta$ and $DGD/T_{bit}$.

FIG. 9 shows the combined feedback signal 28 (i.e. the combined power from both detectors 34, 36), where it is assumed that both detectors 34, 36 provide the same maximum power. In FIG. 9 feedback signal 28 is normalized to a maximum intensity of 1 As discussed above, DLI-feedback and spectral component feedback are "blind" for different splitting ratios, i.e. different angles θ (DLI feedback is "blind" for case of θ=0 and θ=π/2, whereas spectral component feedback is "blind" for θ=π/4). The superposition is never blind for any launch condition. In other words: since the angles θ for intensity signals 35 and 37 are different where the intensity vanishes irrespectively of the DGD, the combined intensity does not vanish irrespectively of the DGD. Moreover, as evident from FIG. 9, for a DGD up to 1.1 $T_{bit}$, the combined intensity signal 28 is nearly independent of the input polarization state (i.e. independent of θ), which allows to have nearly the same adaption behavior for all angles θ. The feedback algorithms tends to adapt PMDC 21 such that feedback signal 28 becomes minimal (i.e. the remaining DGD becomes 0), i.e. the feedback signal is minimized by adjusting the control signals (see control signals 30, 31 in FIG. 2) of PMDC 21.

Appropriate adaption algorithms (see unit 29 in FIG. 1) are discussed in "Dynamic Performance and Speed Requirement of Polarization Mode Dispersion Compensations", Journal of Lightwave Technology, Vol. 24, Nol. 11, Nov. 2006, pages 3968-3975, the disclosure of these algorithms hereby incorporated by reference. Further adaption algorithms are described in the document "Particle Swarm Optimization Used as a Control Algorithm for Adaptive PMD Compensation", Xiaoguang Zhang et al., IEEE Photonics Technology Letters, Vol. 17 No. 1 Jan. 2005, and in the document "Highly Stable 160-Gb/s Field Transmission Employing Adaptive PMD Compensator with Ultra High Time-Resolution Variable DGD Generator", Yoshihiro Kanda et al., ECOC 2008, Paper We.3.E.6, 21-25 Sep. 2008, Brussels, the description of these algorithms is hereby incorporated by reference.

When combining both feedback components 35, 37, polarization scrambling at the transmitter is no longer necessary and the polarization scrambler can be avoided, reducing the costs of the transmission system.

Figure 10:
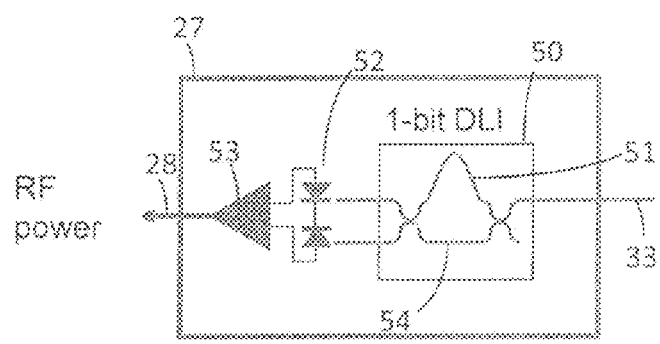
FIG. 10 illustrates an embodiment of the second solution for generating a feedback signal (the polarization scrambler is not shown in FIG. 10)

According to a second solution of the patent application, a feedback signal 28 for adjusting PMDC 21 in FIG. 1 may be generated by a feedback signal generator 27 having a DLI intensity detector (without a parallel spectral component intensity detector). Such feedback signal generator 27 may be DLI intensity detector 27 as shown in FIG. 10 and which was already discussed in connection with FIG. 3. DLI intensity detector 27 in FIG. 10 corresponds to DLI intensity detector 34 in FIG. 3. As discussed in detail above, DLI intensity detector 27 comprises a 1-bit DLI 50 having an arm length difference corresponding to 1 bit period. In FIG. 10, upper arm 51 has an extra delay of 1 bit period (25 ps in case of 40 Gbps signal) in comparison to lower arm 54. In DLI 50 the optical signal is split into two beams, one beam in the upper arm 51 and one beam in the lower arm 54. Due to the extra delay in upper arm 51, the beam in upper arm 51 is delayed by 1 bit period in comparison to the beam in lower arm 54. Then, the two beams are superimposed. DLI 50 has two output ports: a constructive output and a destructive output. The signals at the two DLI output ports are then detected by a balanced photodetector 52 having two differential photodiodes. A microwave power detector 53 for measuring the intensity is located downstream of balanced photodetector 52. As discussed in detail in connection with FIG. 8, the measured intensity becomes maximal (for a given DGD) at a polarization launching angle of θ=π/4, whereas the intensity vanishes at θ=0 and at θ=π/2.

Due to this reason, a polarization scrambler is used at the transmitter or upstream of PMDC 21 at the receiver side of fiber 7. When using a fast polarization scrambler, feedback signal values for a different set of launch conditions may be generated within the integration time of the feedback detector. Thus, a mean feedback signal essentially independent of the launch conditions may be generated. Such polarization scrambler is described in said application PCT/FR2008/051865 and the remarks to the polarization scrambler are herewith incorporated by reference.

Figure 11:
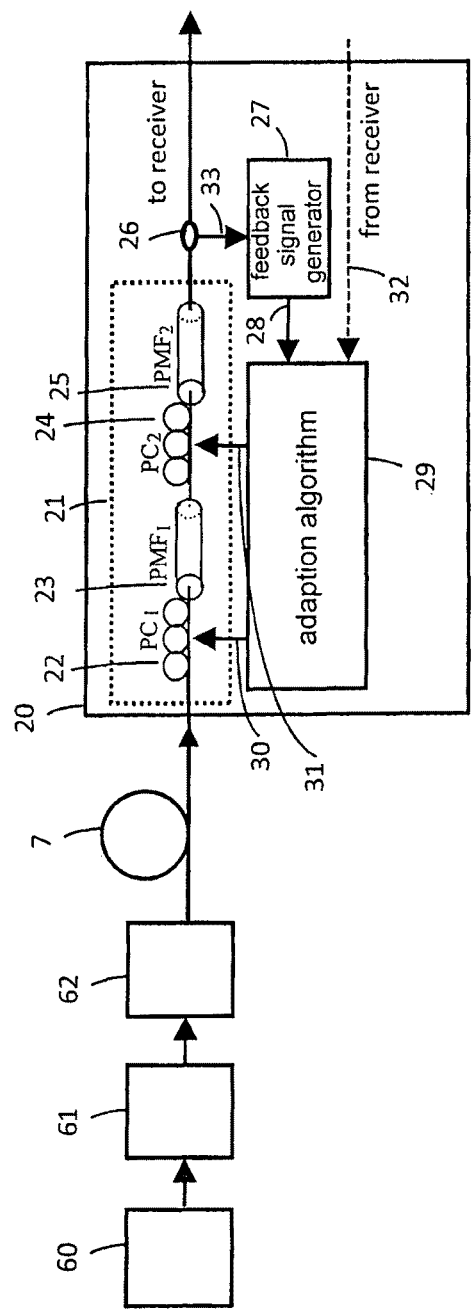
FIG. 11 illustrates an embodiment of a feedback loop for adapting a PMDC according to the second solution.

FIG. 11 shows the resulting communication system when incorporating a polarization scrambler. Figurative elements in FIGS. 1 and 11 denoted by the same reference signs correspond to each other. A transmitter 60 generates an Apol signal, e.g. a 40/43 Gbps Apol RZ DPSK signal. Here, a polarization scrambler 61 is placed between transmitter 60 and optical amplifier 62. Polarization scrambler 61 is adapted for scrambling the orthogonal polarizations of the Apol signal and thus for scrambling across various (or even all) input polarization states of PMDC 21 such that a mean feedback signal 27 is generated over the polarization states covered by polarization scrambler 61. The scrambler speed should be higher than the acquisition time of the PMDC feedback algorithm to ensure that the feedback signal gets independent of the input polarization state (i.e. the feedback signal preferably solely depends on the DGD). E.g. the scrambler speed is preferably of the order of several MHz if the time scale for the feedback signal acquisition is roughly 1 μs.

Alternatively, polarization scrambler 61 may be placed in front of PMDC unit 20 at the receiver side (not shown).

What is claimed is:

1. A method of generating a feedback signal, the feedback signal for adjusting a polarization mode dispersion compensator and the feedback signal based on an alternate-polarization optical signal, the optical signal being downstream of the compensator, the method comprising the steps of:

determining a first signal
    by measuring a spectral component of modulation of the optical signal or of a signal based thereon, wherein the modulation is at a radio frequency;
determining a second signal
    by coupling the optical signal into a delay line interferometer providing between its arms a delay corresponding to a symbol period or an odd multiple of the symbol period,
    by optical-to-electrical converting downstream of the delay line interferometer, and
    by intensity measuring downstream of the optical-to-electrical conversion; and
combining the first signal and the second signal, thereby generating the feedback signal.

2. The method of claim 1, wherein the radio frequency corresponds to half a symbol rate of the optical signal.

3. The method of claim 1, wherein the step of determining the first signal comprises:
    optical-to-electrical converting based on the optical signal;
    bandpass filtering an electrical signal after optical-to-electrical conversion, the bandpass filtering having a center frequency corresponding to the radio frequency;
    intensity measuring of a signal after bandpass filtering.

4. The method of claim 1, wherein the delay line interferometer outputs two output signals, and wherein the optical-to-electrical converting is performed by using a balanced photodetector.

5. The method of claim 1, wherein the alternate-polarization optical signal is a return-to-zero signal.

6. The method of claim 1, wherein the alternate-polarization optical signal is a differential phase shift keying signal.

7. A method for adapting a polarization mode dispersion compensator, the method comprising the steps of:
    generating a feedback signal according to the method of claim 1; and
    based on the feedback signal, determining at least one control signal for controlling the polarization mode dispersion compensator.

8. The method of claim 7, wherein the method minimizes the feedback signal.

9. An apparatus for generating a feedback signal, the feedback signal for adjusting a polarization mode dispersion compensator and the feedback signal based on an alternate-polarization optical signal, the optical signal being downstream of the compensator, the apparatus comprising:
    first determining means for determining a first signal, wherein the first determining means are configured to measure a spectral component of modulation of the optical signal or of a signal based thereon, wherein the modulation is at a radio frequency;
    second determining means for determining a second signal, wherein the second determining means comprise
        a delay line interferometer providing between its arms a delay corresponding to a symbol period or an odd multiple of the symbol period, the optical signal coupled into the delay line interferometer,
        a photodetector downstream of the delay line interferometer; and
        means for intensity measuring downstream of the photodetector; and
    means configured to combine the first signal and the second signal (35), thereby generating the feedback signal.

10. The apparatus of claim 9, wherein
the radio frequency corresponds to half a symbol rate of the optical signal;
the delay line interferometer has two output ports and the photodetector is a balanced photodetector, and
wherein the first determining means comprise:
    a photodetector; and
    downstream of the photodetector, an electrical bandpass filter having a center frequency corresponding to the radio frequency.

11. A polarization mode dispersion compensator unit, comprising:
    an optical polarization mode dispersion compensator;
    downstream of the compensator, the apparatus for generating a feedback signal according to claim 9; and
    means for deriving at least one control signal for controlling the compensator based on the feedback signal.

12. A method for compensating polarization mode dispersion, the method comprising the steps of:
    coupling a received alternate-polarization optical signal in a polarization mode dispersion compensator;
    generating a feedback signal based on an optical signal downstream of the compensator, wherein the feedback signal is determined
        by coupling the optical signal downstream of the compensator into a delay line interferometer providing between its arms a delay corresponding to a symbol period or an odd multiple of the symbol period,
        by optical-to-electrical converting downstream of the delay line interferometer, and
        by intensity measuring downstream of the optical-to-electrical conversion; and
    based on the feedback signal, determining at least one control signal for controlling the polarization mode dispersion compensator,
    wherein polarization scrambling is performed upstream of the polarization mode dispersion compensator.

13. A system for compensating polarization mode dispersion, the system comprising:
    a polarization scrambler;
    downstream of the polarization scrambler, an optical polarization mode dispersion compensator configured to receive an alternate-polarization optical signal;
    downstream of the compensator, an apparatus for generating a feedback signal, wherein the apparatus comprising
        a delay line interferometer providing between its arms a delay corresponding to a symbol period or an odd multiple of the symbol period, with an optical signal downstream of the compensator coupled into the delay line interferometer,
        a photodetector downstream of the delay line interferometer; and
        means for intensity measuring downstream of the photodetector; and
    means for deriving at least one control signal for controlling the compensator based on the feedback signal.

* * * * *